US008662236B2

(12) United States Patent
Koestler et al.

(10) Patent No.: US 8,662,236 B2
(45) Date of Patent: Mar. 4, 2014

(54) SPRING-AND-DAMPER ASSEMBLY

(75) Inventors: Ulrich Koestler, Hebertshausen (DE); Arne Koehler, Munich (DE); Nadja Kaiser, Koblenz (DE); Gerhard Stein, Salz (DE)

(73) Assignee: Stabilus GmbH, Koblenz (DE)

( * ) Notice: Subject to any disclaimer, the term of this patent is extended or adjusted under 35 U.S.C. 154(b) by 8 days.

(21) Appl. No.: 13/116,825

(22) Filed: May 26, 2011

(65) Prior Publication Data

US 2011/0290576 A1    Dec. 1, 2011

(30) Foreign Application Priority Data

May 27, 2010  (DE) .......................... 10 2010 029 410

(51) Int. Cl.
*B62D 25/12* (2006.01)
*B60T 7/22* (2006.01)

(52) U.S. Cl.
USPC ........................... 180/274; 180/69.2; 403/135

(58) Field of Classification Search
USPC ...................... 180/274, 69.2, 69.21; 277/635; 403/132, 133, 135
IPC .......................................................... B60R 21/34
See application file for complete search history.

(56) References Cited

U.S. PATENT DOCUMENTS

| | | | | |
|---|---|---|---|---|
| 1,389,224 A * | 8/1921 | Sheppy | .......................... | 403/135 |
| 1,747,741 A * | 2/1930 | Sprung | .......................... | 403/135 |
| 2,186,935 A * | 1/1940 | Barrows | ..................... | 384/190.2 |
| 2,445,984 A * | 7/1948 | Weber | ........................ | 384/190.3 |
| 2,768,857 A * | 10/1956 | Albrecht | ........................ | 296/117 |
| 4,182,529 A * | 1/1980 | Taylor | ........................... | 293/132 |
| 4,973,097 A * | 11/1990 | Hosan et al. | .................... | 296/76 |
| 6,234,554 B1 * | 5/2001 | Willey | ......................... | 296/78.1 |
| 6,942,056 B2 * | 9/2005 | Nadeau et al. | ............... | 180/274 |
| 7,000,720 B2 * | 2/2006 | Polz et al. | .................. | 180/69.21 |
| 7,163,394 B2 * | 1/2007 | Sevinc | ............................ | 433/19 |
| 7,303,040 B2 * | 12/2007 | Green et al. | .................. | 180/274 |
| 7,387,181 B2 * | 6/2008 | Adoline et al. | ............ | 180/69.21 |
| 7,410,027 B2 * | 8/2008 | Howard | ....................... | 180/274 |
| 7,475,752 B2 * | 1/2009 | Borg et al. | .................... | 180/274 |
| 7,506,716 B1 * | 3/2009 | Salmon et al. | ............... | 180/274 |

(Continued)

FOREIGN PATENT DOCUMENTS

DE  1157021  11/1963
DE  4007698  9/1991

(Continued)

*Primary Examiner* — Nicole Verley
(74) *Attorney, Agent, or Firm* — Cozen O'Connor

(57) ABSTRACT

Spring-and-damper assembly articulated at a front hood and body of a motor vehicle and has, in a cylinder, a gas pressure damper with a damping piston, a piston rod outwardly loaded by the gaseous medium through an axial opening in the cylinder and assists opening of the front hood. An actuator activated by a sensor device to adjust the front hood into a raised pedestrian protection position. The piston rod or the cylinder or a structural component part is axially adjustable relative to a supporting part supporting the assembly to be limited between stops. The structural component part or supporting part is a ball head supported in a joint socket or a joint head having a joint socket for a ball head connected at least indirectly to the piston rod or to the cylinder. The joint socket is formed so as to be groove-shaped in axial direction so that the ball head is axially adjustable in the joint socket in a limited manner.

5 Claims, 3 Drawing Sheets

(56) References Cited

U.S. PATENT DOCUMENTS

| | | | |
|---|---|---|---|
| 7,537,073 B2 * | 5/2009 | Kalliske et al. | 180/69.24 |
| 7,559,398 B2 * | 7/2009 | Karlsson | 180/274 |
| 7,594,555 B2 * | 9/2009 | Lutter et al. | 180/69.21 |
| 7,597,166 B2 * | 10/2009 | Parks | 180/69.2 |
| 7,617,898 B2 * | 11/2009 | Leong | 180/69.2 |
| 7,637,344 B2 * | 12/2009 | Park | 180/274 |
| 7,703,966 B2 * | 4/2010 | Waters | 362/577 |
| 7,931,111 B2 * | 4/2011 | Kim et al. | 180/274 |
| 7,963,715 B2 * | 6/2011 | Burton | 403/135 |
| 8,056,183 B2 * | 11/2011 | Shoemaker et al. | 16/58 |
| 8,069,943 B2 * | 12/2011 | Takahashi | 180/274 |
| 2005/0024551 A1 * | 2/2005 | Battles | 349/58 |
| 2006/0213709 A1 * | 9/2006 | Yamaguchi et al. | 180/69.21 |
| 2007/0187993 A1 * | 8/2007 | Kalargeros | 296/193.11 |
| 2008/0175654 A1 * | 7/2008 | Schilz et al. | 403/132 |
| 2009/0048734 A1 | 2/2009 | Iwai et al. | |
| 2009/0255379 A1 * | 10/2009 | Hsieh | 81/124.5 |
| 2009/0288297 A1 * | 11/2009 | Schmidt et al. | 29/898.052 |
| 2010/0238654 A1 * | 9/2010 | Waters | 362/219 |
| 2011/0290575 A1 * | 12/2011 | Kaiser et al. | 180/274 |

FOREIGN PATENT DOCUMENTS

| | | |
|---|---|---|
| DE | 101 28 967 | 12/2002 |
| DE | 10323118 | 12/2004 |
| DE | 10325351 | 12/2004 |
| DE | 10 2007 009096 | 8/2008 |
| GB | 2 452 333 | 3/2009 |
| JP | 2006-524164 | 10/2006 |
| JP | 2008-056068 | 3/2008 |
| JP | 2009-012549 | 1/2009 |
| JP | 2009-045965 | 3/2009 |
| KR | 10-2002-0046010 | 6/2002 |
| WO | WO2004/094203 | 11/2004 |
| WO | WO 2008/026423 | 3/2008 |

* cited by examiner

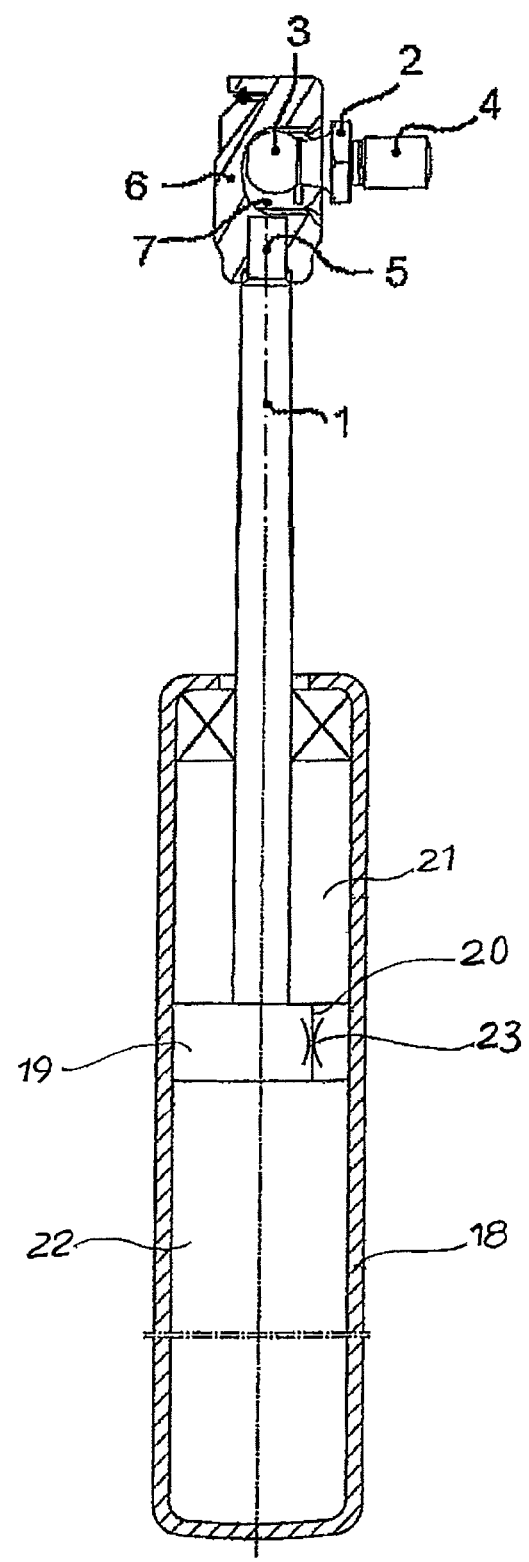

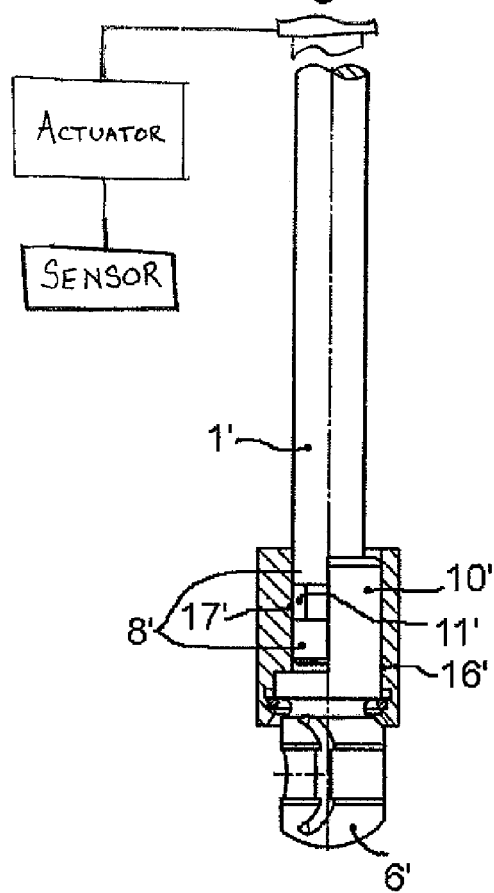
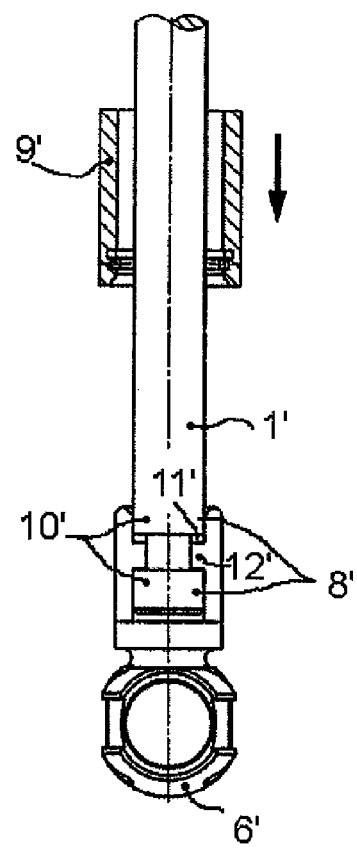
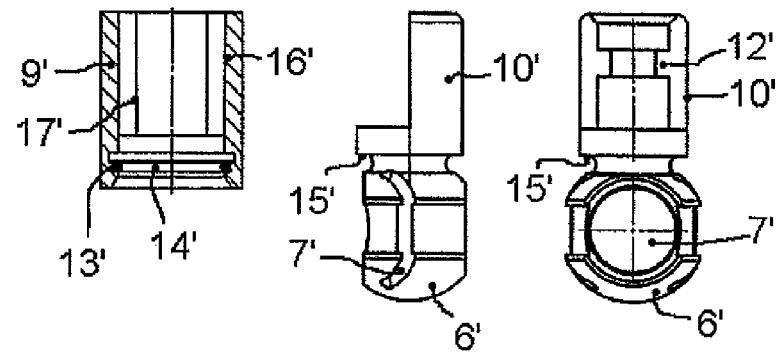
Fig. 4  Fig. 8
Fig. 5  Fig. 6  Fig. 7

SPRING-AND-DAMPER ASSEMBLY

BACKGROUND OF THE INVENTION

1. Field of the Invention

The invention is directed to a spring-and-damper assembly which is articulated directly or indirectly at a front hood and at the body of a motor vehicle and has, in a cylinder, a gas pressure damper with a damping piston, a piston rod which is outwardly loaded by the gaseous medium through an axial opening in the cylinder projects from this damping piston and assists opening of the front hood, having an actuator which is activated by a sensor device so as to adjust the front hood into a raised pedestrian protection position.

2. Description of the Related Art

A spring-and-damper assembly of the type mentioned above which is used in DE 103 25 351 B4 has an opening device having a gas pressure damper with a damping piston in a cylinder, a piston rod which is outwardly loaded by the gaseous medium through an axial opening in the cylinder projects from this damping piston and assists opening of the front hood. The spring-and-damper assembly also has an adjusting device forming an actuator activated by a sensor device in the event of impact with a pedestrian to lift the front hood into a raised pedestrian protection position. A suspension and/or damping device that can cushion and/or damp an impact with a pedestrian on the front hood in the pedestrian protection position is located under the front hood raised into the pedestrian protection position. The piston rod or the cylinder or a structural component part of the spring-and-damper assembly connected therewith is axially adjustable relative to a supporting part supporting the assembly so as to be limited between stops such that the opening device is decoupled, and therefore inoperative, along the entire adjustment path of the front hood from the closed position into the raised pedestrian protection position. In this way, the front hood can be raised quickly into the pedestrian protection position upon pedestrian impact, but it must be taken into account that in so doing the front hood executes a swinging process in which the front hood swings into the pedestrian protection position only after at least once overshooting and at least once undershooting the pedestrian protection position. If pedestrian impact with the front hood takes places when the front hood is overshooting or undershooting the pedestrian protection position in this manner, the front hood and the suspension and/or damping device located below the latter may not absorb the pedestrian impact to an optimal degree.

SUMMARY OF THE INVENTION

It is an object of the invention to provide a spring-and-damper assembly that causes a faster adjustment of the front hood to the pedestrian protection position when the actuator causes the front hood to be raised into the pedestrian protection position.

It is provided that the piston rod or the cylinder or a structural component part of the spring-and-damper assembly connected therewith is axially adjustable, relative to a supporting part supporting the assembly so as to be limited between stops, such that the spring-and-damper assembly is decoupled only in an initial adjustment range of the adjustment path of the front hood from the closed position into the pedestrian protection position. At the end of the initial adjustment path, the piston rod or the cylinder or a structural component part connected therewith contacts a stop such that the damper of the spring-damper assembly is operative when the front hood is raised further into the pedestrian protection position by the actuator. The further raising of the front hood into the pedestrian protection position is then damped by the damper such that the front hood adjusts more quickly to the pedestrian protection position in which a pedestrian impact can be absorbed in an optimal manner to prevent or substantially lessen injuries. Surprisingly, the damper which becomes operative at the indicated time causes a faster adjustment of the front hood to the pedestrian protection position rather than a slower adjustment.

According to one embodiment of the invention, it is provided that the structural component part or supporting part is a ball head supported in a joint socket or a joint head having a joint socket for a ball head, and the ball head or the joint head is connected at least indirectly to the piston rod or to the cylinder, and the joint socket is formed so as to be groove-shaped in axial direction. Accordingly, an axial adjustment path in which the spring-damper assembly is not operative is realized in this embodiment by a corresponding relative displacement of the ball head in the groove-shaped joint socket, wherein the adjustment range is limited in the two opposing displacement directions by the interaction of the ball head with the end regions of the groove-shaped joint socket.

In one embodiment of the invention, the structural component part or supporting part is a ball head supported in a joint socket or a joint head having a joint socket for a ball head, and the ball head or joint head is constructed on the radial inner side in some areas so as to be cylinder-segment-shaped and is moved toward a cylinder-segment-shaped outer region of the cylinder or piston rod and is fixed in an axially adjustable manner so as to be limited in its position by a bushing that is axially inserted and fixed in position on a cylinder-segment-shaped outer region of the joint head or ball head and on an at least approximately cylindrical region of the cylinder or of the piston rod. An axial adjustment range in which the damper of the spring-damper assembly is not operative is realized in this case between the ball head or joint head and the respective piston rod or cylinder by a few simple structural component parts. These structural component parts can be exchanged individually with other vehicle-specific structural component parts, for example, if the spring-damper assembly is to be used in a different vehicle by the same or by another vehicle manufacturer.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Two embodiment examples of the invention are described more fully with reference to the drawings. In the drawings:

FIG. 1A is a simplified sectional view through a damping piston and a ball head connection.

FIG. 4 is a simplified sectional view through a fastening device for fixing a joint head to a piston rod;

FIG. 5 is a cross section through the bushing used in FIG. 4 for securing the joint head in position at the piston rod;

FIG. 6 is a side view of the joint head in FIG. 4;

FIG. 7 is a view of the joint socket of the joint head rotated relative to FIG. 6 around the longitudinal axis of the joint head; and FIG. 8 is a view corresponding to FIG. 4 in which the joint head is not yet secured by the bushing at the piston rod in the installed position.

DETAILED DESCRIPTION OF DRAWINGS

A first embodiment example of a spring-and-damper assembly which, for example, is articulated at its end regions directly or indirectly at a front hood and at the body, of a motor vehicle has in a cylinder a gas pressure damper having a differential-pressure damping piston arranged so as to be axially displaceable between two work spaces under pressure by a gaseous medium. At least one throttle opening is formed in the damping piston or in the cylinder or in a line connecting the work spaces. The gaseous medium flows in a throttled manner through the throttle opening when there are changes in the length of the spring-damper assembly, and a damping force opposing the change in length of the spring-and-damper assembly is brought about, on one hand, at the piston rod 1 connected to the damping piston and outwardly loaded by the gaseous medium through an axial opening in the cylinder and, on the other hand, at the cylinder. A gas spring that acts at the front hood in the opening direction and accordingly reinforces normal opening of the front hood is formed by the differential-pressure damping piston at which the pressure forces of the gaseous medium in the two work spaces of the cylinder cause different axial pressure forces, or, in total, a force in the embodiment example for lengthening the spring-damper assembly, by the piston rod 1 projecting from one side of the damping piston.

Figure 1:
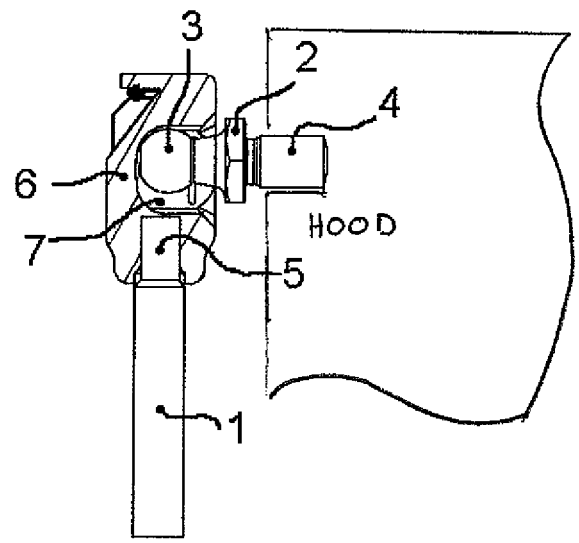
FIG. 1 is a simplified sectional view through a ball head connection of a piston rod, wherein the damper is operative after an initial adjustment path of the front hood caused by the actuator.

In one embodiment the piston rod 1 of the spring-damper assembly is supported at the front hood or at the body by a supporting part 2 that has a ball head 3 that is fixed to the front hood or to the body by a screw connection 4 to prevent rotation. A joint head 6 having a joint socket 7 for the ball head 3 is fastened to the free end region of the piston rod 1 to prevent rotation by another screw connection 5, for example. The joint socket 7 is groove-shaped in axial direction of the piston rod 1 so that the ball head 3 is axially adjustable in the joint socket 7 in direction of the longitudinal axis of the piston rod 1 so as to be limited by the end regions of the groove-shaped joint socket 7. The adjustment range of the ball head 3 in the joint socket 7 corresponds to an initial adjustment path of the front hood from the closed position in direction of the pedestrian protection position in which the damper of the spring-damper assembly is substantially inoperative. This corresponding initial adjustment path is shorter than the change in length of the spring-damper assembly that results when the front hood is adjusted from the closed position into the pedestrian protection position. During further adjustment of the front hood by the actuator from the end of the initial adjustment path into the pedestrian protection position, the damper of the spring-damper assembly acts in a damping manner so that the front hood surprisingly adjusts to the pedestrian protection position faster and without a significant overshooting or undershooting of the pedestrian protection position. In doing so, the ball head 3 constantly contacts the end region of the joint socket 7 shown in FIG. 1.

In this embodiment, a groove in which a radially resilient retaining ring engages is formed in the area of an access opening of the joint socket 7 to secure the ball head 3 in the joint socket 7.

As shown in FIG. 1A, piston rod 1 is connected to differential-pressure damping piston 19 arranged in cylinder 18. At least one throttle opening 23 is formed in the damping piston 19 or in a line 20 to connect a first work space 21 to a second work space 22.

A second embodiment of the invention will be described in the following with reference to FIGS. 4 to 8. Structural component parts comparable to or identical to those in the first embodiment example are provided with an identical reference numeral in the second embodiment example, but with a superscript symbol to aid in differentiation. In the second embodiment example an actuator is provided along with a spring-damper assembly at the front hood of a motor vehicle. In the event of pedestrian impact, the actuator is activated by a sensor device and adjusts the front hood into a raised pedestrian protection position in which the front hood can better absorb an impact, for example, of the head or upper body of a pedestrian.

The spring-and-damper assembly corresponding to the second embodiment example is likewise articulated directly or indirectly at a front hood and at the body of the motor vehicle. A gas pressure damper having a differential-pressure damping piston is arranged in a cylinder and a piston rod 1' which is outwardly loaded by the gaseous medium through an axial opening in the cylinder and which reinforces an opening of the front hood projects from this differential-pressure damping piston.

An actuator activated by a sensor device adjusts the front hood, not visible in the drawings, into a raised pedestrian protection position.

Figures 2, 3:
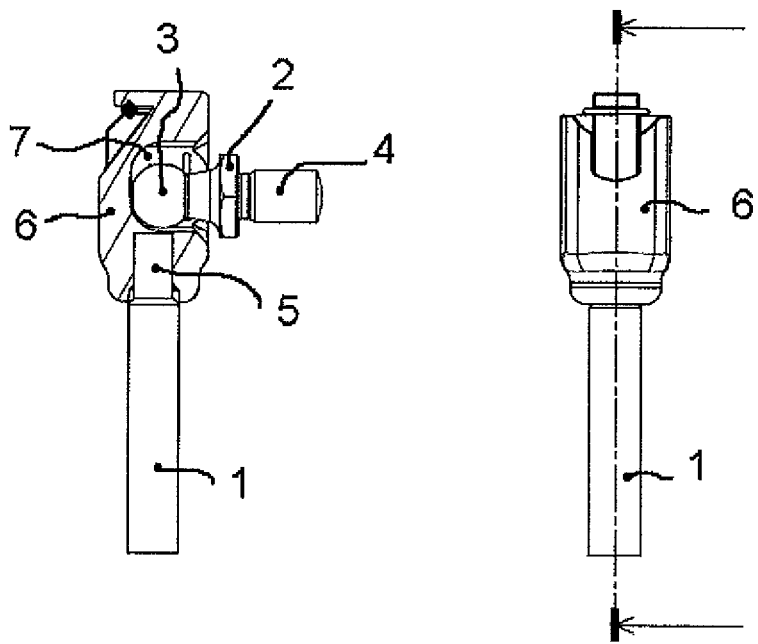
FIG. 2 is a view corresponding to FIG. 1 in which the front hood is closed and the actuator and damper are inoperative.
FIG. 3 is the ball head connection corresponding to FIGS. 1 and 2 in a side view.

Piston rod 1' which is connected to the differential-pressure damping piston in the cylinder of the spring-damper assembly is axially adjustable relative to a joint head 6' with a joint socket 7' for a ball head of a supporting part fastened to the front hood or to the body so as to be limited between stops. The ball head can correspond to the ball head 1 of the first embodiment example shown in FIGS. 1 and 2.

The joint head 6' in the second embodiment example is formed on the radially inner side in some areas so as to be approximately semi-cylindrical with an inner diameter corresponding to the outer diameter of the piston rod. When the joint head 6' has been brought up to a substantially cylindrical outer region 8' of the piston rod 1' which is adapted in diameter, as is shown in FIG. 8, the joint head 6' can be held in contact with the piston rod 1' by pushing a bushing 9' in direction of the arrow in FIG. 8 onto a cylinder-segment-shaped outer region 10' of the joint head 6' and onto a cylindrical region 8' of the piston rod 1' having a corresponding diameter.

The joint head 6' is fixed axially at the piston rod 1' in the embodiment example of a radial recess 11' in the piston rod 1' in which there engages a collar 12' is adapted in width and projects radially inward from the approximately semi-cylindrical region of the joint head 6'.

A spring ring 13' which can be seen, for example, in FIGS. 4 and 5 is provided for axially fixing the bushing 9' in the installed position and is captively arranged in a receiving recess 14' in the bushing 9' in a radially resilient manner and engages behind a supporting shoulder 15' at the joint head 6' automatically when the bushing 9' is in the assembled position.

To axially fix the ball head or joint head 6' to the outer front region of the piston rod 1', either a radial recess is formed in the cylinder-segment-shaped inner region of the ball head or joint head and a radial projection engages in this radial recess, or a radial recess 11' is formed at the piston rod. A collar 12' that projects radially inward at the cylinder-segment-shaped inner region of the ball head or joint head 6' engages in this radial recess 11'.

The bushing 9' has, on the radially inner side, two approximately cylinder-segment-shaped inner regions 16', 17' having different diameters. One region 16' is adapted to the outer diameter of the at least cylinder-segment-shaped outer region 10' of the ball head or socket head 6', and the other region 17' is adapted to an approximately cylindrical outer diameter of the piston rod 1'. The at least approximately cylinder-segment-shaped inner regions 16', 17' are arranged, at least in some areas, radially opposite one another, or axially directly adjacent to one another, or adjacent to one another at an axial distance.

The invention can be modified so as to differ from the embodiment example. The structural component part or the supporting part supporting the spring-damper assembly can be a ball head supported in a joint socket or a joint head with a joint socket for a ball head. The ball head or the joint head can be connected to the piston rod or to the cylinder at least indirectly. The joint socket can be groove-shaped in axial direction so that the ball head is axially adjustable in a limited manner in the joint socket. The ball head or joint head can be approximately semi-cylindrical in some areas on the radially inner side and moved toward a cylindrical outer region of the cylinder or piston rod and is fixed in an axially adjustable manner so as to be limited in its position by a bushing which is axially inserted and fixed in position on a cylinder-segment-shaped outer region of the joint head or ball head and on a cylindrical region of the cylinder or of the piston rod having a corresponding diameter. When the front hood is adjusted upward into the pedestrian protection position by the actuator, a region of the cylinder or of the piston rod or of the ball head or of the joint head or of the structural component part can contact a stop of another part. During further adjustment of the front hood into the pedestrian protection position brought about by the actuator and/or the gas pressure spring and/or another pre-loaded spring element, the gas pressure damper of the spring-and-damper assembly operates in a damping manner at the front hood so that the front hood does not overshoot upward and/or downward of the pedestrian protection position, or, if so, barely or slightly. The differential-pressure damping piston is axially adjustable between two work spaces which are under pressure by the gaseous medium and connected via at least one throttle opening in the cylinder or damping piston or in a line connecting the two work spaces. The supporting part can be a ball head supported in a joint socket or a joint head having a joint socket for a ball head which, for example, is held by itself or by an intermediate part so as to be fixed with respect to relative rotation. The ball head can be secured by itself or by any retaining part. The ball head or joint head can be secured to the piston rod or to the front hood or to the body in any manner. When the bushing is used, this bushing can be fastened in the installed position to the piston rod or to the cylinder or to the ball head or to the joint head in any manner. The cylinder-segment-shaped inner regions and the cylinder-segment-shaped outer region of the bushing can extend in circumferential direction at any angle sufficient to fix the bushing and the ball head or joint head. In so doing, it is possible that the ball head or joint head is fixed at least indirectly to the piston rod so as to be rotatable or so as to be fixed with respect to relative rotation. The bushing can have two cylindrical inner regions on the radially inner side which are axially offset relative to one another, and a cylindrical inner region thereof is adapted to the at least cylinder-segment-shaped or cylindrical outer region of the ball head or joint head, and the other cylindrical inner region of the bushing is adapted to the adjacent outer diameter of the piston rod. The ball head supported in a joint socket can allow the spring-damper assembly to swivel in a plane or in space. By ball head is also meant a joint head having a pin around whose axis the spring-damper assembly is swivelable.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A spring-and-damper assembly that is articulated one of directly or indirectly at a front hood and at a body of a motor vehicle comprising:
    a cylinder;
    a gas pressure damper with a damping piston arranged in the cylinder;
    a piston rod, which is outwardly loaded by a gaseous medium through an axial opening in the cylinder, that projects from the damping piston and assists opening of the front hood;
    a sensor device; and
    an actuator activated by a sensor device and configured to adjust the front hood into a raised pedestrian protection position,
    wherein at least one of the piston rod, the cylinder, and a structural component part connected therewith is axially adjustable relative to a supporting part supporting the assembly so as to be limited between stops,
    wherein at least one of the structural component part and supporting part is configured as a ball head supported in one of a joint socket and a joint head having a joint socket for a ball head, the one of the ball head and joint head connected at least indirectly to one of the piston rod, the cylinder, and the joint socket and is formed so as to be groove-shaped in axial direction so that the ball head is axially adjustable in the joint socket in a limited manner,
    wherein a region of one of the cylinder, the piston rod, and the ball head or of the joint head or of the structural component part contacts a stop of another part when the front hood is adjusted upward into the pedestrian protection position by the actuator,
    wherein the gas pressure damper of a spring-and-damper assembly is configured to operate in a damping manner at the front hood during further displacement of the front hood into the pedestrian protection position brought about by one of the actuator, the gas pressure spring, and another pre-loaded spring element, so that the front hood does not overshoot either upward and downward of the pedestrian protection position, and wherein the damping piston is a differential-pressure damping piston axially adjustable between two work spaces under pressure by the gaseous medium and are connected via at least one of one throttle opening in one of the cylinder and damping piston and a line connecting the two work spaces.

2. The spring-and-damper assembly according to claim 1, wherein the supporting part is one of a ball head supported in a joint socket and a joint head having a joint socket for a ball head which has a threaded portion that can be inserted into one of a thread at the front hood or body and at an intermediate part connected therewith and is held by a rotation-preventing device to be fixed with respect to relative rotation.

3. The spring-and-damper assembly according to claim 2, wherein the ball head is secured in the joint socket by a retaining part configured as a retaining ring engaging in a groove in the joint socket in the area of an access opening of the joint socket, and one of the ball head and the joint head is screwed one of onto and into a thread arranged at one of the cylinder, the piston rod, and at a structural component part connected therewith.

4. The spring-and-damper assembly according to claim 1, wherein the supporting part is one of a ball head supported in a joint socket and a joint head having a joint socket for a ball head which has a threaded portion that can be inserted into one of a thread at the front hood or body and at an intermediate part connected therewith and is held by a rotation-preventing device to be fixed with respect to relative rotation.

5. A spring-and-damper assembly that is articulated one of directly or indirectly at a front hood and at a body of a motor vehicle comprising:
   a cylinder;
   a gas pressure damper with a damping piston arranged in the cylinder;
   a piston rod, which is outwardly loaded by a gaseous medium through an axial opening in the cylinder, that projects from the damping piston and assists opening of the front hood;
   a sensor device; and
   an actuator activated by a sensor device and configured to adjust the front hood into a raised pedestrian protection position,
   wherein at least one of the piston rod, the cylinder, and a structural component part connected therewith is axially adjustable relative to a supporting part supporting the assembly so as to be limited between stops,
   wherein at least one of the structural component part and supporting part is configured as a ball head supported in one of a joint socket and a joint head having a joint socket for a ball head, the one of the ball head and joint head connected at least indirectly to one of the piston rod, the cylinder, and the joint socket and is formed so as to be groove-shaped in axial direction so that the ball head is axially adjustable in the joint socket in a limited manner, and
   wherein the ball head is secured in the joint socket by a retaining part configured as a retaining ring engaging in a groove in the joint socket in the area of an access opening of the joint socket, and one of the ball head and the joint head is screwed one of onto and into a thread arranged at one of the cylinder, the piston rod, and at a structural component part connected therewith.

* * * * *